(12) United States Patent
Gillespie et al.

(10) Patent No.: US 11,093,428 B2
(45) Date of Patent: Aug. 17, 2021

(54) CONVERTIBLE I/O SIGNAL PROCESSOR FOR A PROCESS CONTROL NETWORK

(71) Applicant: Phoenix Contact Development and Manufacturing, Inc., Middletown, PA (US)

(72) Inventors: Brian John Gillespie, Hummelstown, PA (US); Davis Mathews, Lewisberry, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 2 days.

(21) Appl. No.: 16/733,700

(22) Filed: Jan. 3, 2020

(65) Prior Publication Data

US 2021/0209049 A1 Jul. 8, 2021

(51) Int. Cl.
*G06F 13/40* (2006.01)
*G06F 13/38* (2006.01)
*H01R 13/66* (2006.01)
*H01R 12/70* (2011.01)
*H01R 12/71* (2011.01)

(52) U.S. Cl.
CPC ........ *G06F 13/4068* (2013.01); *G06F 13/382* (2013.01); *H01R 12/7047* (2013.01); *H01R 12/716* (2013.01); *H01R 13/6658* (2013.01)

(58) Field of Classification Search
CPC .. G06F 13/382; G06F 13/4068; G06F 13/385; G06F 13/4022; G06F 13/4027; H01R 12/6658; H01R 12/7047; H01R 12/716

USPC ......................................................... 710/313
See application file for complete search history.

(56) References Cited

U.S. PATENT DOCUMENTS

| | | | |
|---|---|---|---|
| 7,822,896 B1 | 10/2010 | Sagues et al. | |
| 9,971,727 B2 | 5/2018 | Brodbeck et al. | |
| 9,978,486 B2 * | 5/2018 | Buckner | H05K 3/301 |
| 10,083,143 B2 | 9/2018 | Tanimura et al. | |

OTHER PUBLICATIONS

European Patent Office, International Search Report in corresponding PCT/US2020/052089, dated Dec. 11, 2020, 13 pages.

* cited by examiner

*Primary Examiner* — Brian T Misiura
(74) *Attorney, Agent, or Firm* — Hooker & Habib, P.C.

(57) ABSTRACT

A convertible I/O signal processor is convertible between different operating configurations for connecting multiple field devices to the I/O signal processor by selectable types of electrical connectors such as cables, terminal blocks, and the like. The I/O signal processor includes a signal processing module connected to a signal processor and an interface module removably connected to the signal processing module. The interface module includes electrical connectors for receiving/transmitting I/O signals from and to field devices. The interface module and the signal processing module define I/O channels extending between the electrical connectors and the signal processor. The interface module in embodiments includes I/O module connectors that enable removable I/O modules to be interposed in the I/O channels.

27 Claims, 13 Drawing Sheets

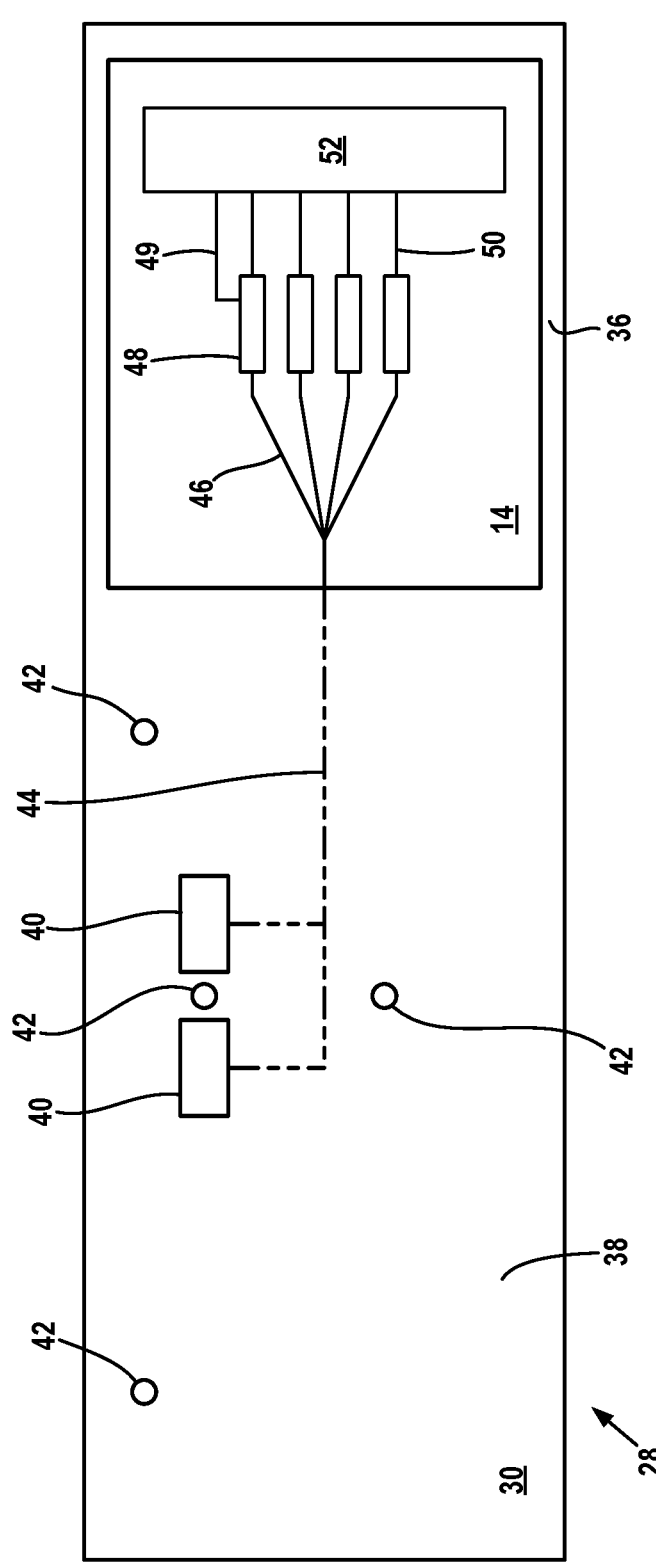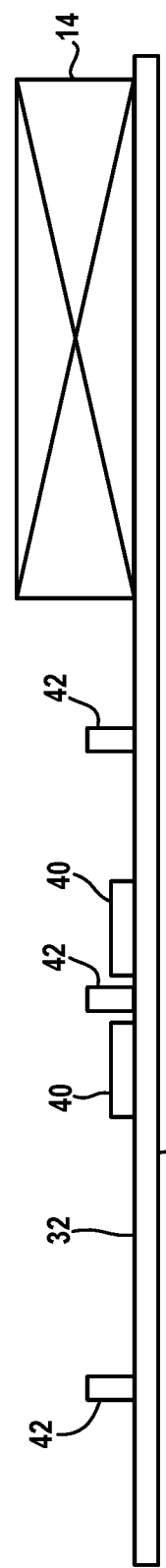
FIG. 3
FIG. 4

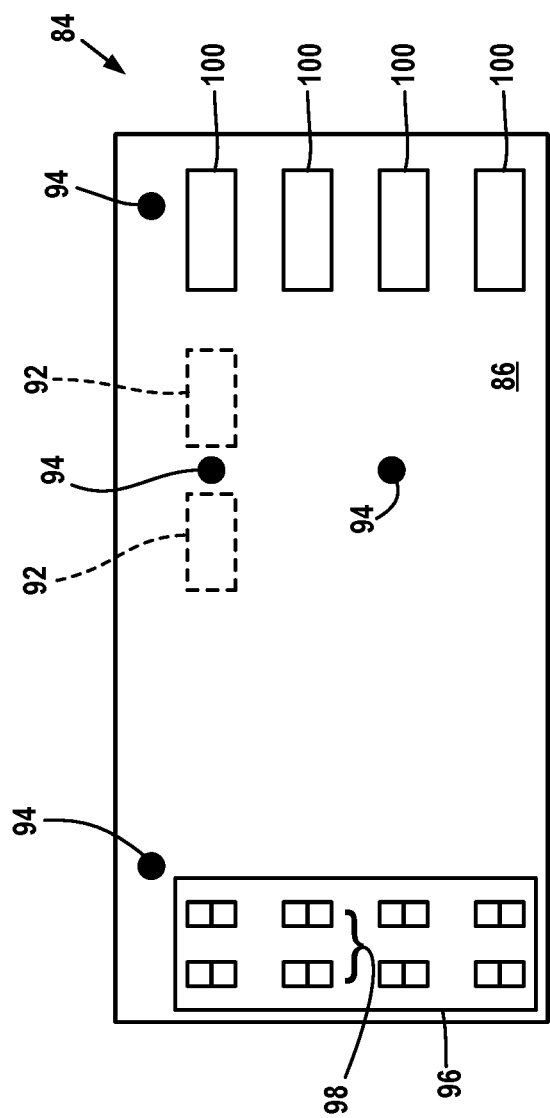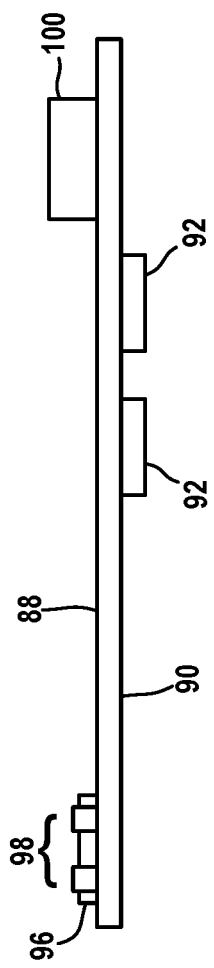

CONVERTIBLE I/O SIGNAL PROCESSOR FOR A PROCESS CONTROL NETWORK

BACKGROUND OF THE DISCLOSURE

Process control networks transmit I/O signals to and from field devices under the control of a control system that regulates and controls industrial processes through controllers. Field devices include sensors and actuators. Sensors transmit input signals representing the state of process variables to the controllers, and actuators receive output signals from the controllers and take action to affect process variables.

I/O signals may be analog signals or digital signals. Analog I/O signals are variable, in which a voltage or current represents the magnitude of a process parameter such as flow rate or the desired position of a valve. Digital I/O signals represent one of two states: "on/off", "opened/closed", and the like.

Other types of digital output signals used in process control are used to actuate a relay or to count pulses.

I/O field wiring from the field devices is often brought to a central location for ease of management. The field wiring may extend to sets of terminals of a terminal block contained in a wiring cabinet. A circuit (referred to as an I/O channel herein) extends from each set of terminals and includes a conversion circuit that ultimately is connected to the control system. The conversion circuit converts between I/O signals compatible with the field device and a digital data format used between the conversion circuit and the control system.

Fixed-mode conversion circuits convert between one type of I/O signal and the digital data format.

Selectable-mode conversion circuits selectively convert between different types of I/O signals and the digital data format. Selectable-mode conversion circuits allow different types of field devices to be connected to each set of terminals of the terminal block.

Devices that include multiple conversion circuits for communicating with multiple field devices are referred to as I/O signal processors herein. An I/O signal processor may be part of a controller, may be part of a head station that communicates to a control system through the process control network, or may be a network node on the process control network that enables a control system to communicate directly with each field device (that is, each field device has its own network address).

Brodbeck, et al. U.S. Pat. No. 9,971,727 "Universal I/O Signal Interposer System", assigned to the applicant and incorporated by reference herein, discloses removable I/O modules referred to as interposers that can be inserted in the I/O channel between the sets of terminals and the conversion circuit to process the I/O signals, supply power to field devices, interpose fuses or other ancillaries in the signal path, and other functions.

The '727 patent discloses an embodiment in which the I/O modules attach to connectors carried on a base. The I/O channels extend from the connectors to a cable connector half that enables a cable to carry the I/O channels to a matching cable connector half on a controller. The I/O channels extend from the cable connector half to respective conversion circuits.

FIG. 20 illustrates a base B that is designed to connect up to four field devices D to four base I/O channel portions I. A base I/O channel portion includes an I/O module electrical connector M for removably inserting an I/O module (not shown) in the base I/O channel portion and extends to a D-sub socket C attached to the base. The socket is connected in parallel with the four base I/O channel portions.

A cable A extends the I/O channels from the D-sub socket C to a D-sub socket of an I/O signal processor P. The I/O signal processor extends the I/O channels to respective conversion circuits (not shown) that convert between I/O signals and the digital data format used by the I/O signal processor. The I/O signal processor shown in FIG. 19 forms part of a process controller.

The base B can be designed to accommodate different types and numbers of electrical connectors for forming electrical connections between the base and field devices and for extension of I/O channel paths away from the field devices.

Within the process control industry, however, there are desires for I/O to accept standardized electrical connections. If implemented, standardized electrical connections would allow connection and interchange of devices to a process control network from different manufacturers within their I/O channel path.

However, standardized electrical connections would come with drawbacks: I/O designs are limited to the size and density constraints of the standardized connection. Additionally, standardization may define I/O signal conversion functionality to be located in modules separate from field wire termination and I/O module functions. This, again, limits the size and density of the overall solution. Proprietary electrical connector designs, on the other hand, allow manufacturers to optimize design, performance, and density for those operators of process control networks who value these characteristics over standardization. As a result, both options—standardized electrical connections and proprietary electrical connections—will have relevance and value in the industry going forward.

It would be desirable to enable operators of process control networks to install field devices using proprietary electrical connections (that might offer advantages over standardized electrical connections) while allowing the operators to later change to using industry standardized electrical connections without major changes to the process control network or incurring substantial costs should they wish to change electrical connections in the future.

Alternatively, it would be desirable to enable operators of process control networks to install field devices using industry standard electrical connections but enabling change over to proprietary electrical connections in the future (to save space, increase the number of field devices, or utilize other advantages of the proprietary electrical connections).

Thus it would be desirable to provide a convertible I/O signal processor that provides the network operator the ability to convert between connecting field devices to the process control network using proprietary electrical connections and then later connecting the field devices using industry standard electrical connections (or vice versa).

SUMMARY OF THE DISCLOSURE

Disclosed is a convertible I/O signal processor for a process control network that provides the network operator the option of converting between connecting multiple field devices to the I/O signal process by selectable types of electrical connectors such as cables, terminal blocks, and the like. In embodiments, removable I/O modules can be interposed in the I/O channels.

Utilizing the disclosed convertible I/O signal processor enables operators of process control networks to install field devices using proprietary electrical connections while enabling future changeover to standardized electrical connections (and vice-versa) without major changes to the process control network and without incurring substantial costs.

An embodiment of a convertible I/O signal processor in accordance with this disclosure includes an interface module and a signal processing module. The interface module includes a first base, and on the first base one or more sets of first electrical connectors, a second electrical connector, and a set of first I/O channel portions. Each first I/O channel portion includes and is electrically connected to a respective set of first electrical connectors and the second electrical connector.

The signal processing module includes a second base, a signal processor, a third electrical connector on the second base, and a set of second I/O channel portions associated with the signal processor. The set of second I/O channel portions electrically connect the signal processor and the third electrical connector. The signal processor includes a respective conversion circuit in each second I/O channel portion that converts between I/O signals and a digital data format used by the process control network.

The second and third electrical connectors are removably attachable to one another. The second and third electrical connectors when attached to one another electrically connect each first I/O channel portion of the set of first I/O channel portions with a respective second I/O channel portion of the set of second I/O channel portions.

The interface module is selectively attachable and detachable from the signal processing module to enable converting the I/O signal processor between different operating configurations.

In an embodiment of the I/O signal processor, the first base includes an upper surface and an opposite lower surface. The one or more sets of first electrical connectors disposed are on the upper surface and the second electrical connector is on the lower surface.

The second base includes an upper surface, the third electrical connector disposed on the upper surface of the second base. The lower surface of the first base is configured to overlay the upper surface of the second base when the second and third electrical connectors are attached to one another.

Interface modules can be provided that have different configurations or types of sets of first electrical connectors, or that connect different numbers or types of field devices to the interface module.

For example, the interface module in embodiments can be configured to connect to four field devices, less than four field devices, or more than four field devices. The sets of first electrical connectors can be configured in embodiments as cable plugs or cable sockets to receive the end of a cable (such as cable A in FIG. 20) or as a terminal block having sets of terminals, each set of terminals being configured to directly land and terminate field wires of a field device.

The I/O channel paths of an interface module in embodiments include additional connectors that removably attach I/O modules such as the type of I/O modules disclosed in the '727 patent for signal processing, ancillary insertion, simple signal pass-through, and the like.

The base of the interface module may be formed as a printed circuit board. The base of the signal processing module may include a printed circuit board that mounts the third electrical connector. The signal processor may be mounted on the same printed circuit board or a different printed circuit board or base portion.

Other objects and features of the disclosure will become apparent as the description proceeds, especially when taken in conjunction with the accompanying drawing sheets illustrating one or more non-limiting embodiments.

BRIEF DESCRIPTION OF THE DRAWINGS

FIGS. 3 and 4 are top and side views respectively of a signal processing module of the I/O signal processor shown in FIG. 1.

FIGS. 11 and 12 are top and side views respectively of a second embodiment interface module.

DETAILED DESCRIPTION

Figure 1:
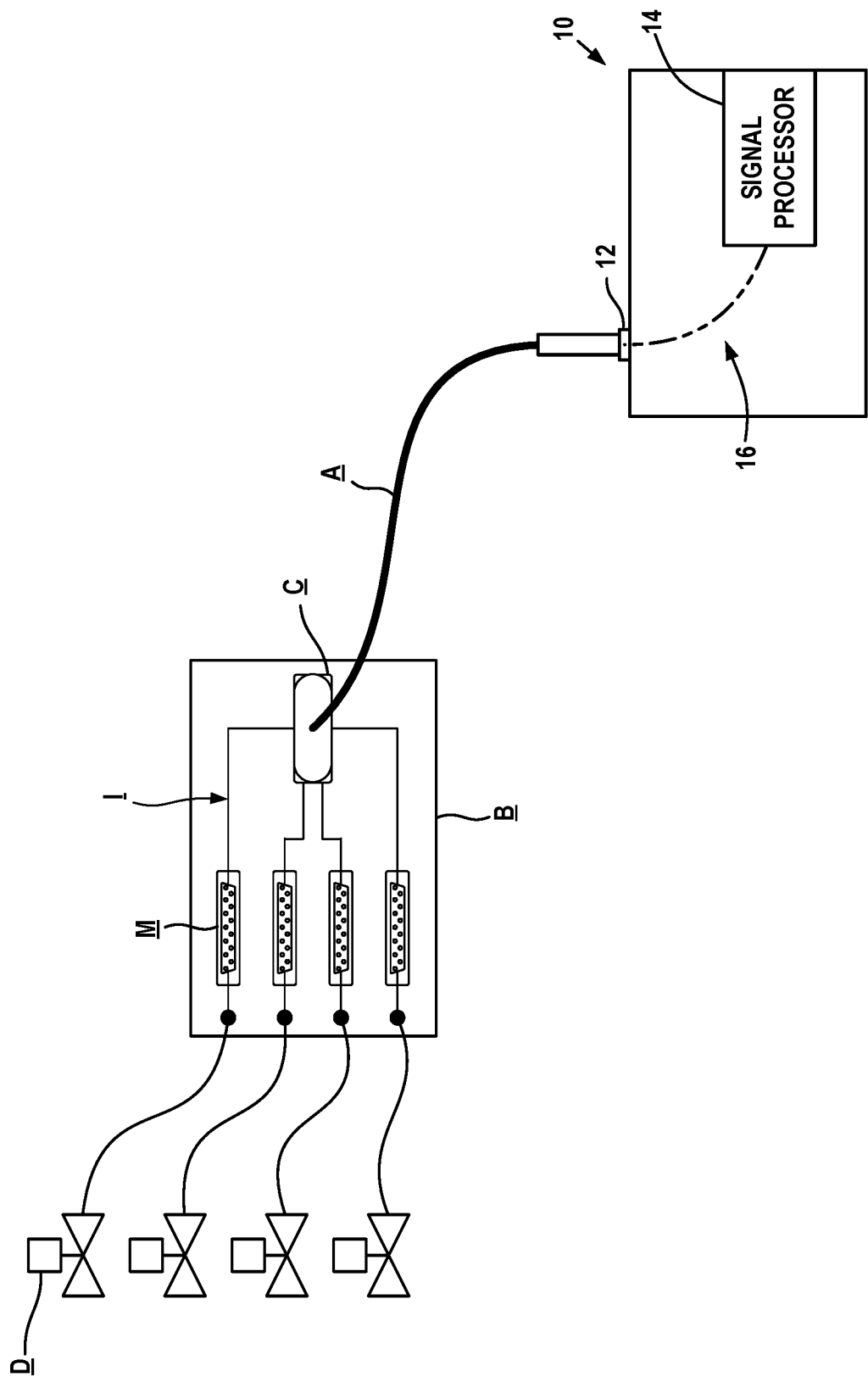
FIG. 1 is a schematic view of an I/O signal processor in accordance with this disclosure in a first operating configuration attached to field devices through a separate base having removable I/O modules.

FIG. 1 illustrates a convertible I/O signal processor 10 in accordance with this disclosure. The I/O signal processor is convertible between at least two operating configurations as will be described in more detail below. The I/O signal processor may be configured for use in a general environment or in a hazardous environment.

Figure 20:
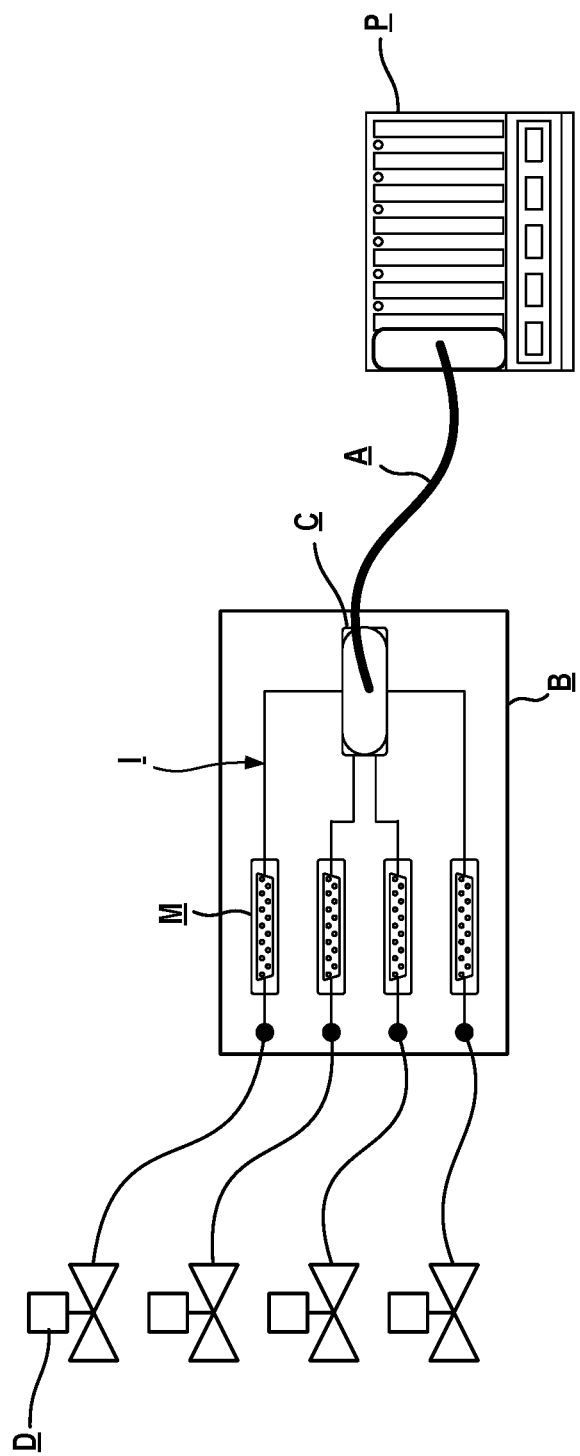
FIG. 20 illustrates an I/O signal processor connected by cables to a base connected to field devices, removable I/O modules plugged into the base.

FIG. 1 illustrates the I/O signal processor 10 in a first operating configuration. In this configuration up to four field devices D can be connected to the I/O signal processor using a cable A having D-sub plugs. The field wires of the field devices are connected to the base terminals of a base B similar to the base B shown in FIG. 20. The base B defines a set I of like base I/O channel portions that extend from the base terminals to a D-sub socket C. Each base I/O channel portion includes an I/O module electrical connector M (the I/O modules plugged in the I/O module connectors are not shown in FIG. 1). Cable A is attached to the base cable connectors C and extends to the I/O signal processor 10.

The convertible I/O signal processor 10 in this first operating configuration includes an exposed electrical connector formed as a D-sub socket 12 operatively connected to a signal processor 14. The D-sub socket 12 connects to an end of the cable A. In the illustrated embodiment the D-sub socket 12 can connect with up to four field devices. The D-sub socket 12 forms part of a set 16 of processor I/O channel portions that extend to the signal processor 14.

As shown in FIG. 1, the base I/O channel portions I, the cable A, and the set 16 of processor I/O channel portions cooperate to define I/O channels that connect the field wires of the devices D and the signal processor 14. Each I/O channel is connected to a respective conversion circuit 48 (shown in FIG. 3) of the signal processor that converts between I/O signals compatible with the field device attached to the I/O channel and the digital data format required for operation of the process control system.

The signal processor 14 transmits digital data converted from the I/O signals received from the field devices and receives digital data to be converted into I/O signals for the field devices or for operation of the signal processor (to set operating modes of selectable-mode conversion circuits for example) via a network port, communications bus, cable, or other form of data transmission.

The conversion circuits may be fixed conversion circuits, selectable-mode conversion circuits, or a mixture of fixed and selectable-mode conversion circuits. Examples of conversion circuits that can be used for the I/O signal processor include, but are not limited to, those provided by the commercially available ANALOG DEVICES AD74412R or AD74413R signal processing integrated circuit (Analog Devices, Inc., One Technology Way, Norwood Mass. 02062-9106 USA).

Figure 2:
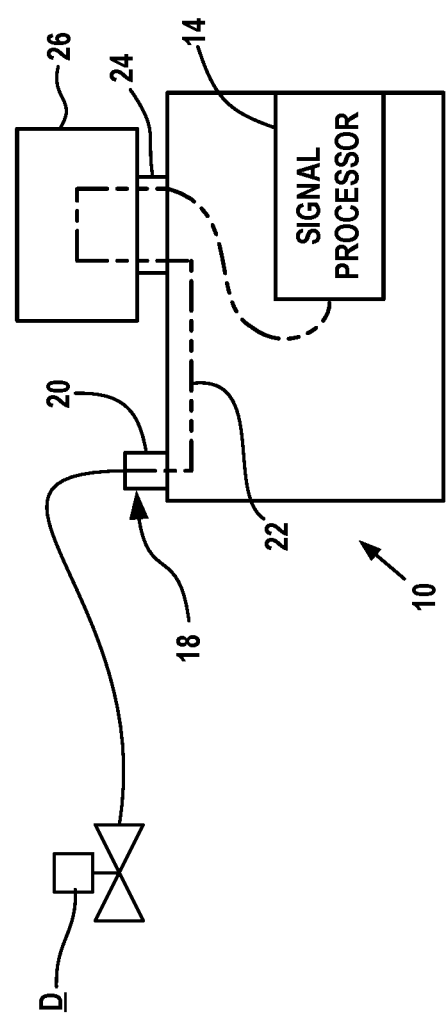
FIG. 2 is a schematic view of the I/O signal processor shown in FIG. 1 in a second operating configuration in which field wires of field devices are attached directly to the I/O signal processor along with removable I/O modules.

FIG. 2 illustrates the I/O signal processor 10 in a second operating configuration that enables connecting the field wires of up to four field devices D directly to the I/O signal processor 10. To simplify the drawing, only one field device D is shown connected to the I/O signal processor.

The I/O signal processor 10 in this second operating configuration includes an exposed terminal block 18 having four respective sets of electrical connectors formed as terminals 20 for connecting the field wires of a field device. Each set of terminals 20 forms part of a respective processor I/O channel portion 22 that extends to and includes an exposed I/O module electrical connector 24 and extends from the I/O module electrical connector to the signal processor 14. The I/O module electrical connector removably holds an I/O module 26.

The signal processor 14 does not change with changes in operating configuration of the I/O signal processor 10.

The I/O module 26 cooperates with the processor I/O channel portion 22 to define an I/O channel that connects the field wires of the device D and the signal processor 14.

As described in more detail below, the I/O signal processor 10 includes a base housing, a signal processing module disposed in the base housing that includes the signal processor 14, and one or more removable interface modules that attach to the signal processing module to establish the operating configuration of the I/O signal processor. The interface modules enable the network operator to select the type of field connections to the I/O signal processor.

FIGS. 3 and 4 illustrate the signal processing module 28. The signal processing module includes a generally rectangular printed circuit board 30 having an upper surface 32 and an opposite lower surface 34 separated by the thickness of the board. Disposed on a first upper surface end portion 36 of the printed circuit board is the signal processor 14. The opposite upper surface second end portion 38 of the printed circuit board is sized to allow an interface module to be placed over it as described later below. Disposed on the second end portion is a pair of closely spaced low profile BTB (board-to-board) connectors 40 and a set of surface-mounted threaded standoffs 42.

The signal processor 14 is associated with a set 44 of I/O channel portions defined by the printed circuit board 30 that extend from the signal processor to the BTB connectors. The set of I/O channel portions includes four separate I/O channel portions. In the signal processor each I/O channel portion 46 includes a conversion circuit 48. One of the conversion circuits is shown being a selectable-mode conversion circuit whose operating mode is set through an operating mode control circuit 49. In possible embodiments some, all, or none of the conversion circuits can be selectable-mode conversion circuits.

Each conversion circuit 48 outputs data in a digital data format to a respective digital output circuit portion 50. The digital output circuit portions extend to a communications circuit 52 that transmits digital data converted from the I/O signals received from the field devices and receives digital data to be converted into I/O signals for the field devices or for operation of the signal processor (to set modes of selectable-mode conversion circuits for example). The communications circuit may send and receive digitally formatted data via a network port, communications bus, cable, or other form of data transmission.

Figure 5:
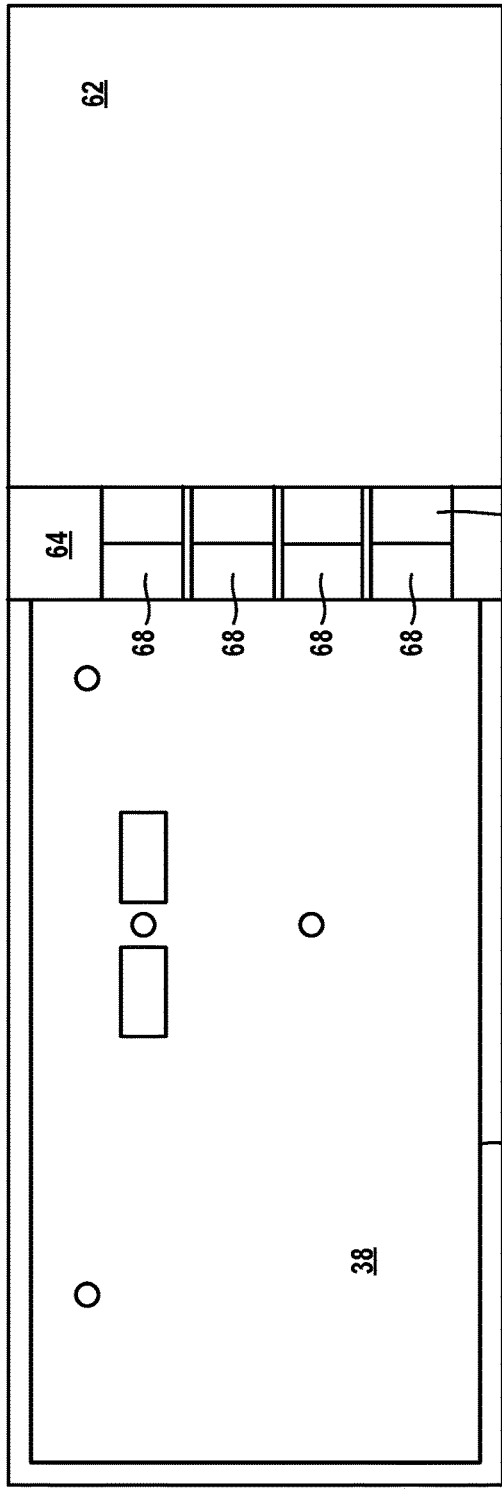
FIGS. 5 and 6 are top and side views respectively of the signal processing module shown in FIG. 3 housed in a base housing of the I/O signal processor.
Figure 6:
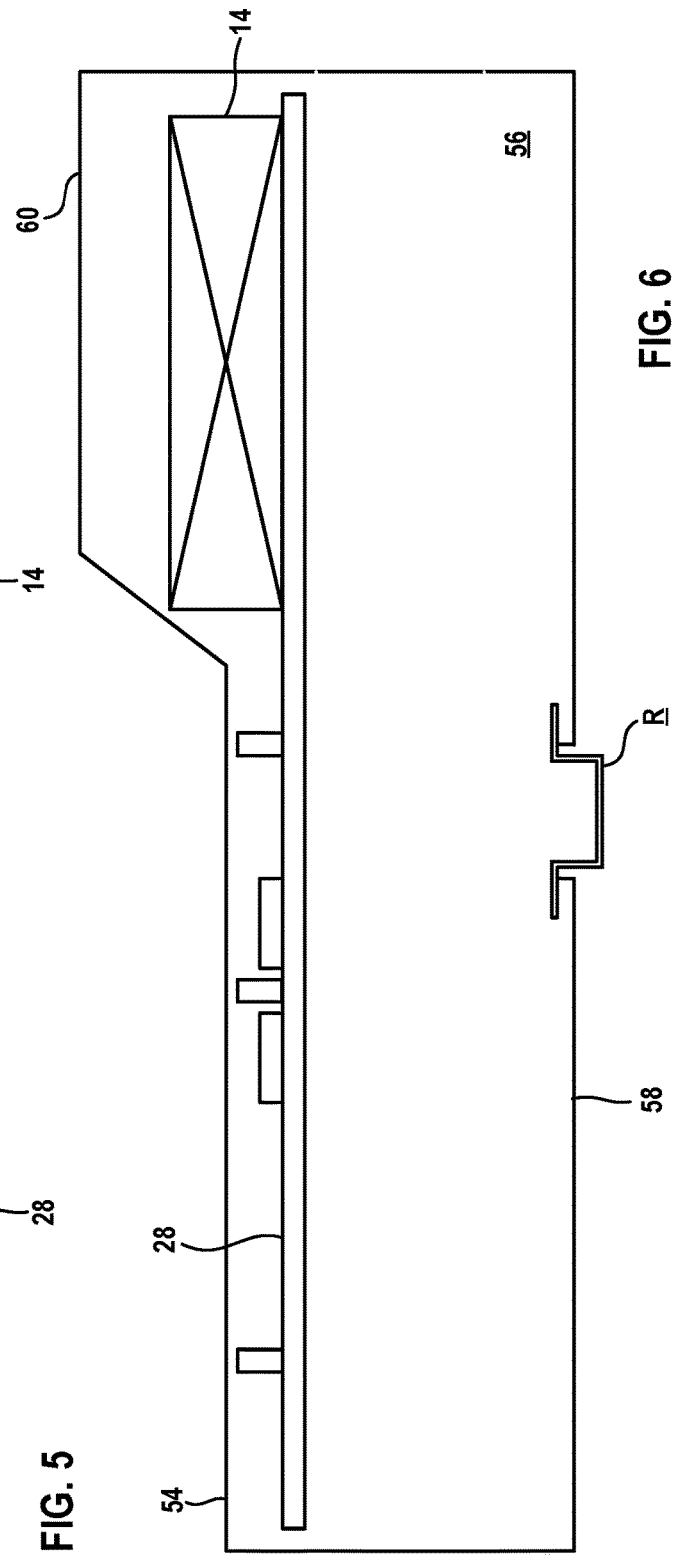

FIGS. 5 and 6 illustrate the signal processing module 28 fixedly mounted in a base housing 54. The base housing includes a generally rectangular body 56 extending from a lower wall 58 closing a lower end of the body and an upper wall 60 that partially closes the upper end of the body. The body in the illustrated embodiment includes mounting structure that mounts the base housing to a DIN rail R.

The base housing 54 is configured to enable close spacing of a number of signal processing modules 28 side-by-side on the DIN rail.

The signal processing module 28 is disposed inside the housing body 56 close to the upper end of the body. The upper wall 60 includes a flat wall portion 62 and a sloping wall portion 64. The flat wall portion overlays the signal processor 14. The sloping wall portion extends from the flat wall portion towards the signal processing module but stops before obstructing access to the upper side of the second upper surface portion 38 of the signal processing module. The sloping wall portion defines through-openings 68 that assist in ventilating the interior of the housing body. The housing body includes additional ventilation openings (not shown) that enable air to pass through the interior of the base housing.

Figure 7:
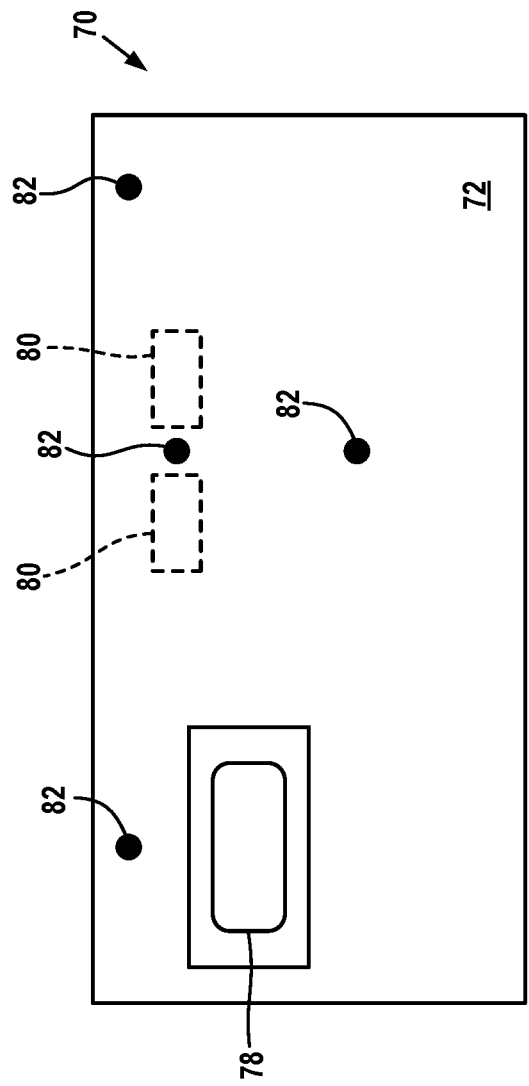
FIGS. 7 and 8 are top and side views respectively of a first embodiment interface module.
Figure 8:
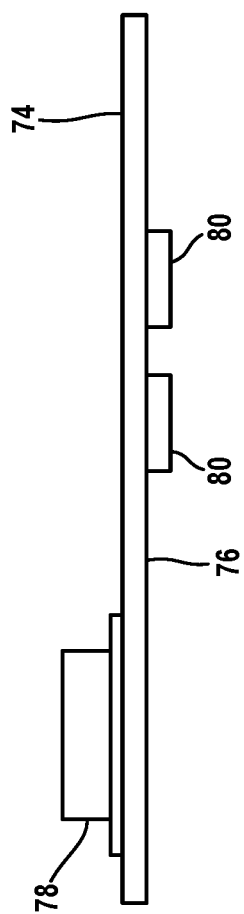

FIGS. 7 and 8 illustrate a first interface module 70 that places the I/O signal processor 10 in the first operating configuration shown in FIG. 1. The interface module includes a generally rectangular printed circuit board 72 having an upper surface 74 and a lower surface 76 separated by the thickness of the printed circuit board. Carried on the upper surface is a surface-mounted D-sub socket 78. Carried on the lower surface are two sets 80 of multiple contact pads (the thickness of the sets of contact pads are exaggerated in the drawings). The printed circuit board electrically connects the D-sub socket with the sets of contact pads to define module I/O channel portions (not shown) extending from the D-sub socket to the contact pads.

A set of through-holes 82 extend through the thickness of the printed circuit board.

Figure 9:
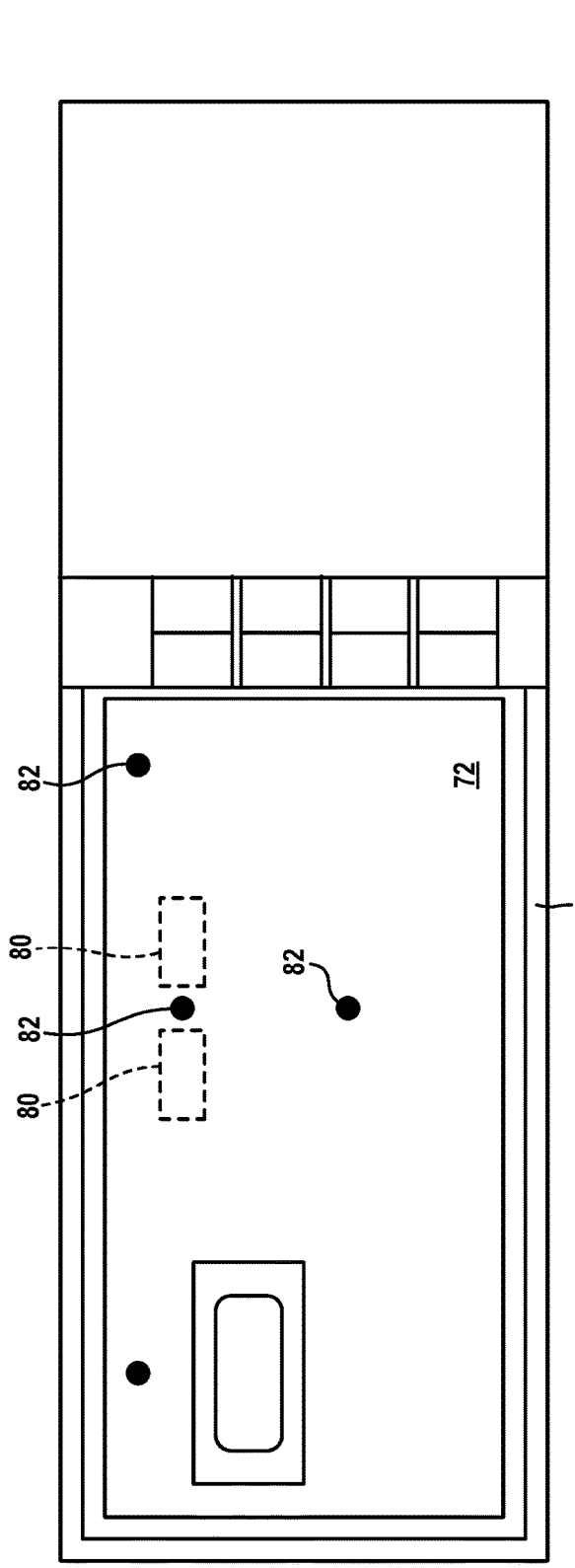
FIGS. 9 and 10 are top and side views respectively of the interface module shown in FIG. 7 attached to the signal processing module shown in FIG. 5 to form the first operating configuration of the I/O signal processor as shown in FIG. 1.
Figure 10:
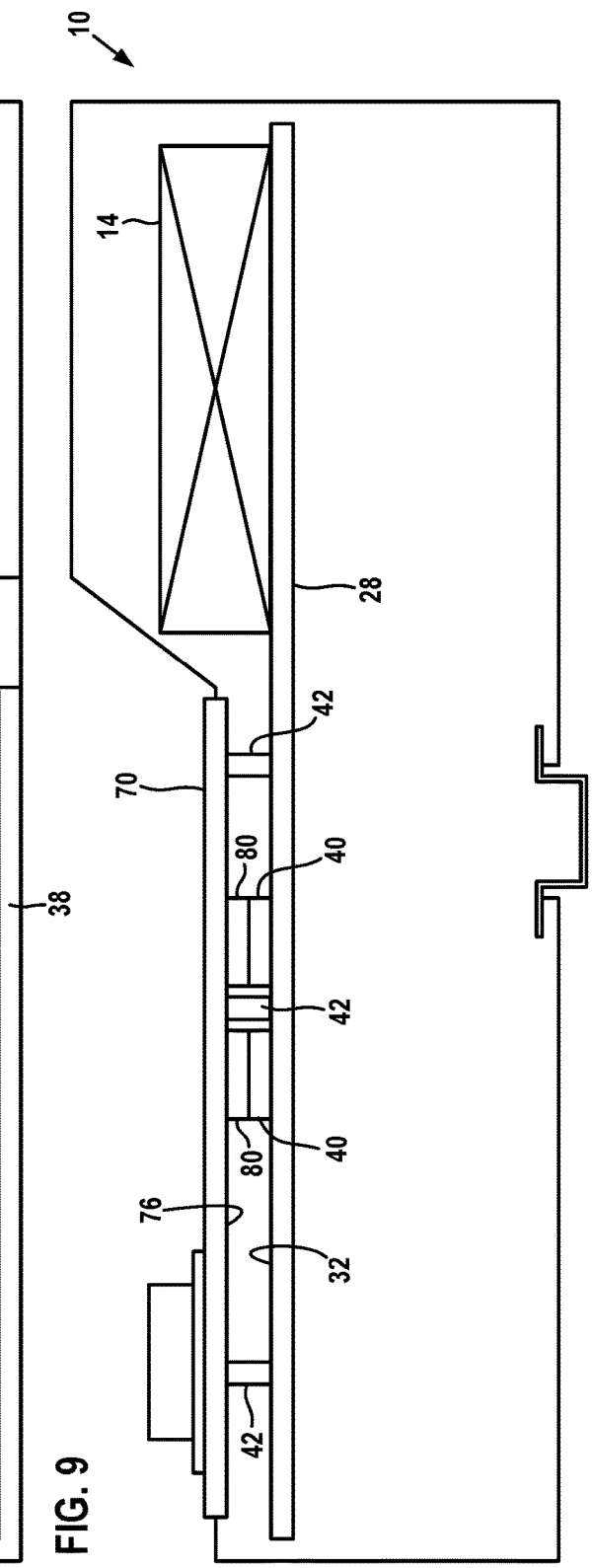

FIGS. 9 and 10 illustrate the I/O signal processor 10 with the first interface module 70 attached to the signal processing module 28. The printed circuit board 72 of the interface module is sized to be received within the projected outer perimeter of the second upper surface end portion 38 of the signal processing module. The lower surface 76 of the interface module faces the upper surface 32 of the signal processing module. The through-holes 82 align with the standoffs 42 to fixedly locate the interface module with respect to the signal processing module, Screws (not shown) extending through the holes and into the standoffs removably fasten the interface module with the signal processing module and act to essentially fix the interface module with respect to the signal processing module during use. The sets 80 of contact pads of the interface module contact the pair of BTB connectors 40 of the signal processing module, electrically connecting the interface module with the signal processing module. The interface module and the signal processing module thereby cooperate to form the set 16 of processor I/O channel portions shown in FIG. 1.

FIGS. 11 and 12 illustrate a second interface module 84 that places the I/O signal processor 10 in the second operating configuration shown in FIG. 2. The second interface module includes a generally rectangular printed circuit board 86 similar in size to the printed circuit board of the first interface module 70. The printed circuit board includes an upper surface and a lower surface 90 separated by the thickness of the printed circuit board. Carried on the lower surface are two sets 92 of multiple contact pads like the contact pads of the first interface module. A set of through-holes 94, like the though-holes of the first interface module, extend through the thickness of the printed circuit board.

The second interface module 84 enables the field wires of field devices to terminate at the second interface module. Instead of cable connectors, the second interface module includes a terminal block 96 that includes sets of electrical connectors formed as four sets of terminals 98. Each set of terminals is configured for landing the field wires of a field device. The terminal block is surface-mounted on the upper surface 88 of the printed circuit board 86.

The number of sets of electrical connectors 98, the number of electrical connectors per set, and the type of electrical connector may differ in embodiments depending on the number of field devices connectible to the second interface module 84, the number of field wires extending from the field devices, the environment of use, and the like.

The second interface module 84 further includes a set of I/O module connectors 100 operatively connected to the sets of terminals 98, each I/O module connector removably mounting an I/O module. The I/O module may be of the type disclosed in the '727 patent for signal processing or pass-through of the I/O signals, to supply power to a connected field device, interpose a fuse, relay, or other ancillary in the signal path, provide test points, and the like. I/O modules may also be provided that provide diagnostics of the I/O channel during operation, enables pre-commissioning evaluation of attached field devices prior to normal operation of the process control network, or other functions. The printed circuit board electrically connects the sets of terminals with the I/O module connectors and the I/O module connectors with the sets 92 of contact pads to define module I/O channel portions extending from the sets of terminal to the I/O module connectors and from the I/O module connectors to the contact pads.

Figures 13, 14:
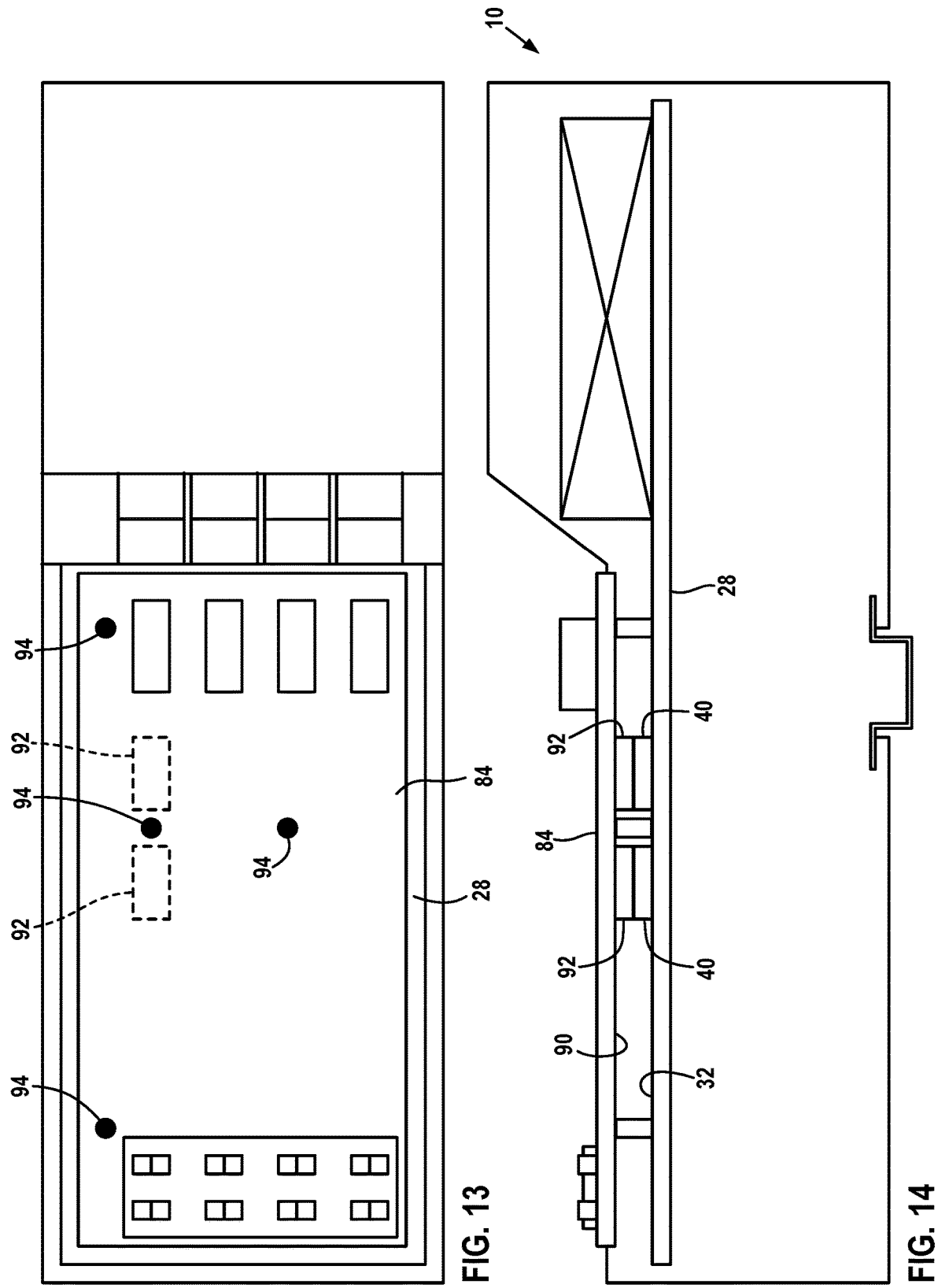
FIGS. 13 and 14 are top and side views respectively of the interface module shown in FIG. 11 attached to the signal processing module shown in FIG. 5.

FIGS. 13 and 14 illustrate the second interface module 84 attached to the signal processing module 28, the lower surface 90 of the second interface module facing the upper surface 32 of the signal processing module. Screws (not shown) threaded through the holes 94 of the second interface module align and attach the second interface module with the signal processing module. The sets of contact pads 94 contact the BTB connectors 40 to electrically connect the interface module with the signal processing module as previously described. The interface module and the signal processing module thereby cooperate (along with the I/O modules when installed) to form the set of processor I/O channel portions 22 shown in FIG. 2.

Figure 15:
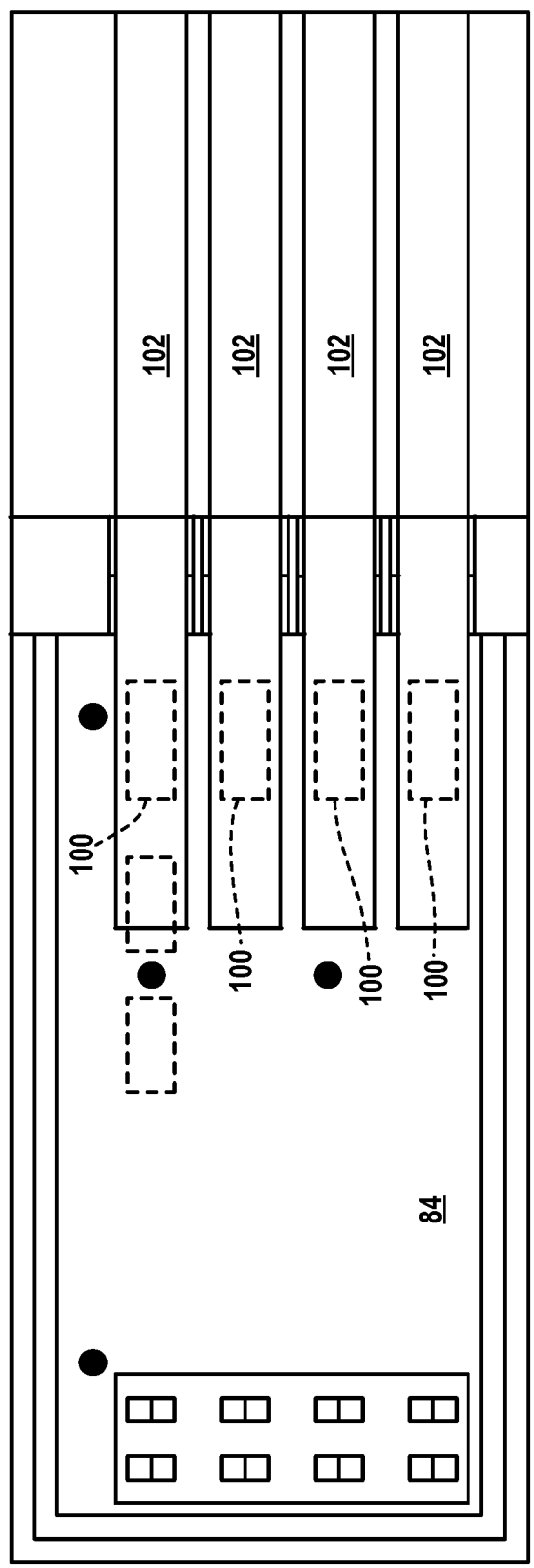
FIGS. 15 and 16 are similar to FIGS. 13 and 14 respectively but with I/O modules plugged into the interface module to form the second operating configuration of the I/O signal processor as shown in FIG. 2.
Figure 16:
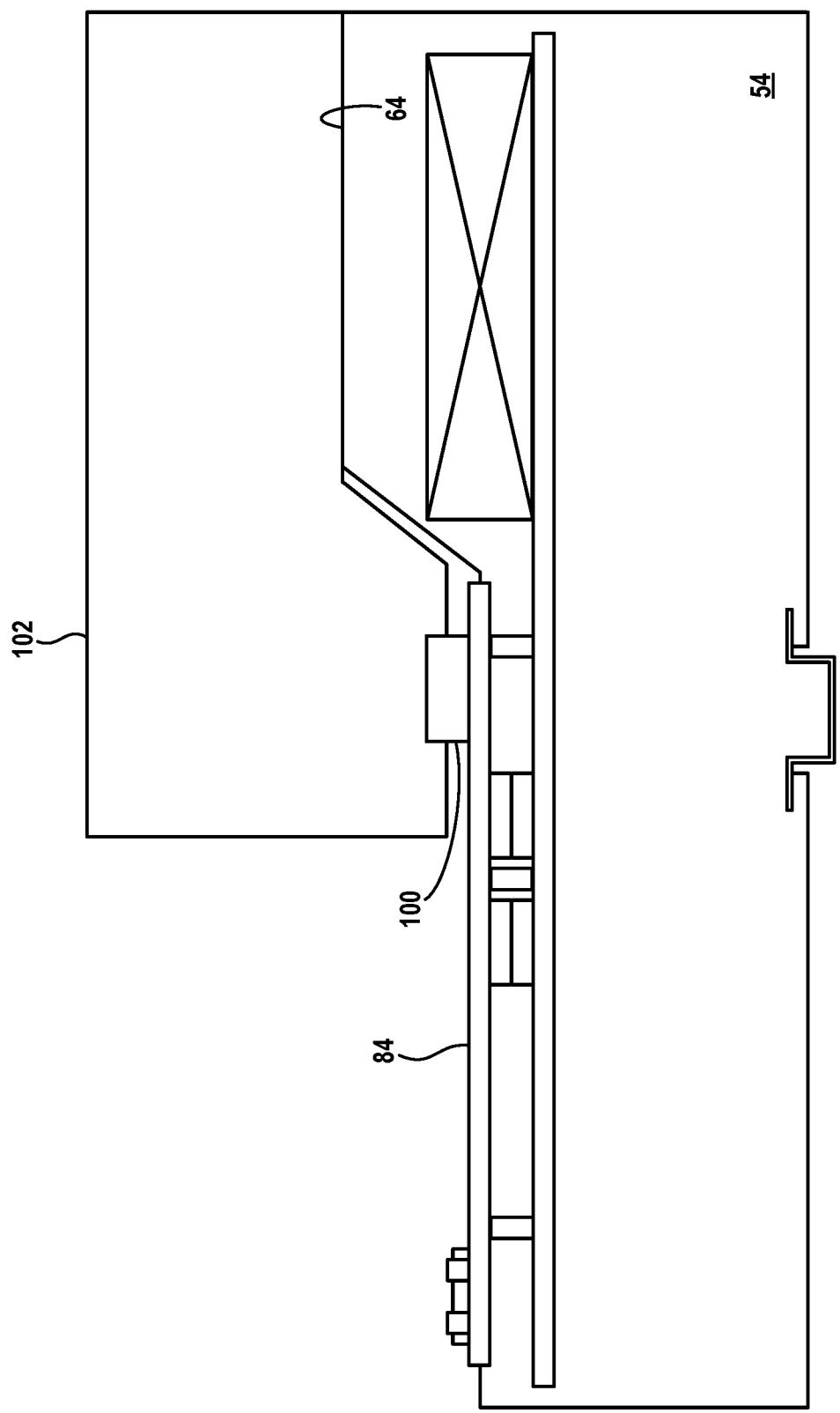

FIGS. 15 and 16 are similar to FIGS. 13 and 14 but also illustrate I/O modules 102 plugged into the I/O connectors 100 of the second interface module 84. The I/O modules are provided additional mechanical support by being disposed against the flat upper wall portion 60 (see FIG. 6) of the base housing 54. The I/O modules extend away from the upper end of the base housing 54 to provide access to terminals, access points, etc. that may be provided by an I/O module.

The I/O modules may also include latches or the like that engage the housing 54 that assist in securing the attachment of the I/O modules.

Figure 17:
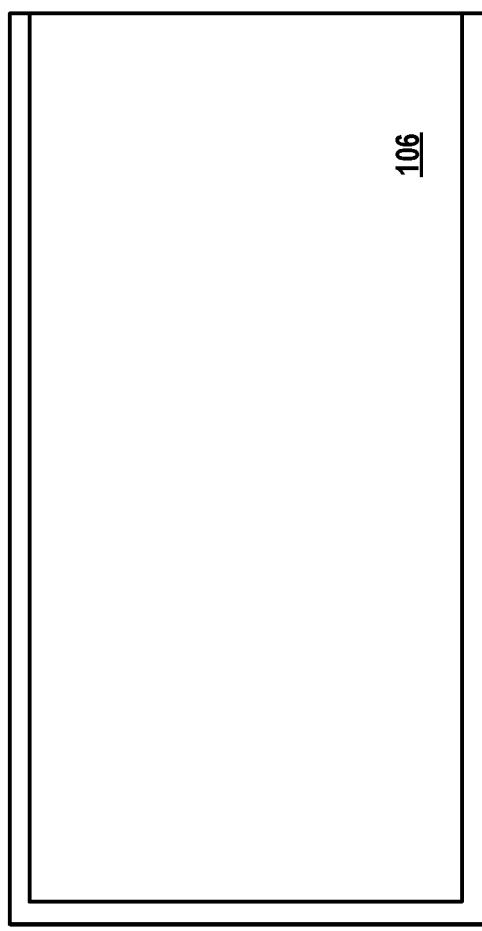
FIGS. 17 and 18 are top and side views respectively of a printed circuit board of an interface module partially surrounded by a frame.
Figure 18:
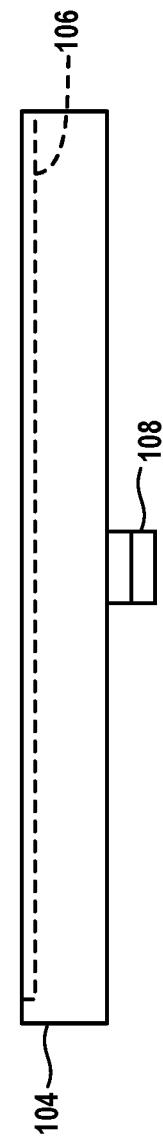

The printed circuit boards of interface modules such as the interface module 106 in possible embodiments are partially surrounded by a U-shaped frame 104 made of plastic or nylon as shown in FIGS. 17 and 18 extending along three sides of a printed circuit board 106. A pair of opposed deformable latch hooks 108 extend away from opposite legs of the frame. The frame extends beyond the lower side of the printed circuit board such that the latch hooks assist in aligning the interface module with the signal processing module 28.

The latch hooks latch against the lower surface of the printed circuit board 30 of the signal processing module when the interface module is attached to the s signal processing module. Alternatively, all or some of the latch hooks engage the housing 54.

In embodiments the frame 104 is a rectangular frame that extends around the entire outer perimeter of the printed circuit board 106. The frame may include a sufficient number of latch hooks located along the frame that assist in detachably attaching the interface module with the signal processing module 28 and/or the housing 54 and fix the interface module with respect to the signal processing module during use without the need for screws or other detachable/removable fasteners.

In other possible embodiments, an interface module 106 may be removably retained in the frame 104 by latches or other retaining structure (not shown) to enable handling the interface module and the frame as a single unit when interchanging interface modules with the signal processing module.

Figure 19:
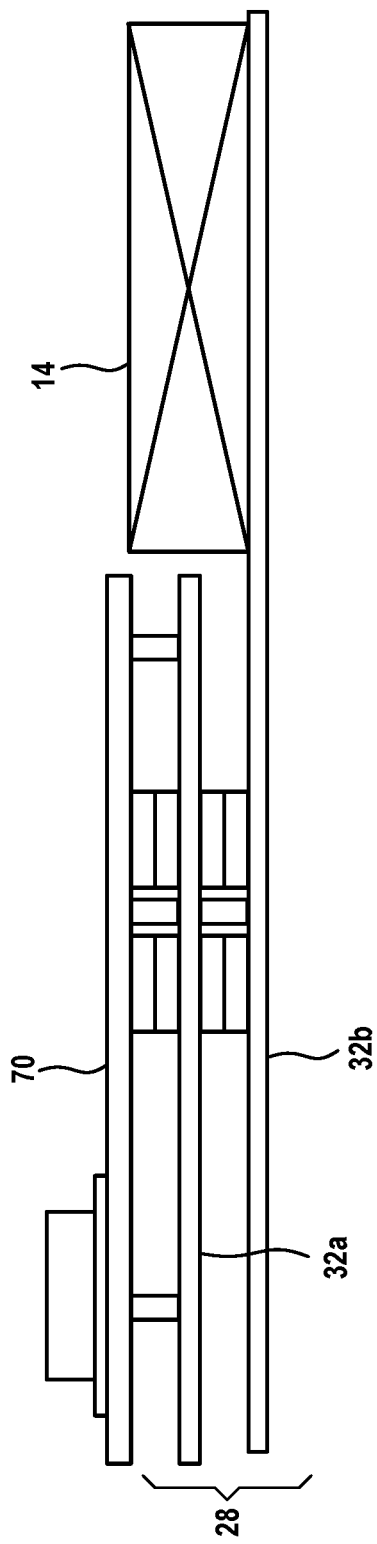
FIG. 19 is a schematic view of the first embodiment interface module attached to a second embodiment signal processing module.

The illustrated signal processing module 28 includes a single printed circuit board that mounts an interface module and the signal processor. FIG. 19 illustrates the interface module 70 attached to a second embodiment signal processing module 28 having an upper printed circuit board 32a electrically connected by board-to-board connectors to a lower printed circuit board 32b. The interface module is attached to the upper printed circuit board and the signal processor 14 is on the lower printed circuit board. The I/O channel portions of the signal processing module extend through the board-to-board connectors.

Although two interface modules have been described in detail, this is not intended to be limiting as the different types of interface modules that can be adapted for use. For example, embodiments of the first interface module may include multiple cable sockets or plugs. Different types of sockets or plugs may be included, including designs for interfacing with proprietary cables, and mixed types of sockets or plugs may be provided. Embodiments of the second interface module may have the sets of terminals connect directly with the contact pads, omitting the I/O module connectors. Interface modules may be designed to connect with a different number of field devices than the illustrated interface modules. Instead of cable connectors or terminals, different connector types or different mixes of connector type can be provided to accommodate different field wiring needs of different types of field devices.

Other examples of electrical connectors that can be used to land wires of a field device in embodiments of interface modules in accordance with this disclosure include, but are not limited to, pluggable wire connectors in which the wires terminate on the electrical connectors, fixed terminals in which the wires enter terminals fixed directly on an interface module, electrical connectors that are removably mounted on the interface module to enable mechanical and/or electrical disconnection of the electrical connectors from the interface module without disturbing field wire attachments to the electrical connectors, male or female electrical connectors that mate with corresponding female or male electrical connectors attached to and forming part of individual field wires, cable connectors for connecting a cable containing the field wires extending from the field device, pin headers, and the like.

While one or more embodiments are disclosed and described, it is understood that this is capable of modification and that the scope of the disclosure is not limited to the precise details set forth but includes modifications obvious to a person of ordinary skill in possession of this disclosure, including (but not limited to) changes in material selection, interface module shape or configuration, signal processing module shape or configuration, housing shape and mounting configuration, and also such changes and alterations as fall within the purview of the disclosure and the following claims.

What is claimed is:

1. A convertible I/O signal processor for communications between field devices of a process control network and a control system of the process control network, the I/O signal processor comprising:

an interface module and a signal processing module;

the interface module comprising a first base, on the first base a plurality of two or more sets of first electrical connectors, a second electrical connector, and a set of first I/O channel portions, each first I/O channel portion including and electrically connected to a respective set of first electrical connectors and the second electrical connector;

the signal processing module comprising a second base, on the second base a signal processor, a third electrical connector on the base, and a set of second I/O channel portions associated with the signal processor, the set of second I/O channel portions electrically connecting the signal processor and the third electrical connector, the signal processor comprising a respective conversion circuit in each second I/O channel portion that converts between I/O signals and a digital data format used by the process control network;

the signal processor further comprising a communications circuit being connected to the respective conversion circuits, the communications circuit being configured and disposed to transmit from the signal processing module digital data received from each respective conversion circuit and to receive into the signal processing module digital data to be converted into I/O signals by the respective conversion circuits;

the second and third electrical connectors being removably attachable to one another, the second and third electrical connectors when attached to one another electrically connecting each first I/O channel portion of the set of first I/O channel portions with a respective second I/O channel portion of the second I/O channel portions and thereby connecting the one or more sets of first electrical connectors terminals with the communication circuit; and the interface module being selectively attachable and detachable from the signal processing module to enable converting the I/O signal processor between different operating configurations.

2. The I/O signal processor of claim 1 wherein the first base comprises an upper surface and an opposite lower surface, the one or more sets of first electrical connectors disposed on the upper surface, and the second electrical connector disposed on the lower surface;

the second base comprises an upper surface, the third electrical connector disposed on the upper surface of the second base; and the lower surface of the first base being configured to overlay the upper surface of the second base when the second and third electrical connectors are attached to one another.

3. The I/O signal processor of claim 1 wherein the first base is a printed circuit board.

4. The I/O signal processor of claim 3 wherein the printed circuit board is at least partially surrounded by a frame, and at least one latch hook extends away from the frame.

5. The I/O signal processor of claim 1 wherein the second base is a printed circuit board.

6. The I/O signal processor of claim 1 wherein the first base is a first printed circuit board and the second base is a second printed circuit board.

7. The I/O signal processor of claim 6 wherein one of the second and third electrical connectors is a board-to-board connector and the other of the second and third electrical connectors comprises contact pads.

8. The I/O signal processor of claim 1 comprising a set of standoffs attached to at least one of the first and second bases, the set of standoffs spacing apart the first base and the second base when the second electrical connector is attached to the third electrical connector.

9. The I/O signal processor of claim 1 comprising a set of through holes in the first base, the through holes aligned over threaded standoffs attached to the second base when the second electrical connector is attached to the third electrical connector.

10. The I/O signal processor of claim 1 wherein the set of first electrical connectors is formed as a cable plug or cable socket attachable with a corresponding cable socket or cable plug of a cable.

11. The I/O signal processor of claim 1 wherein the set of first electrical connectors is formed as sets of terminals of a terminal block, each set of terminals being configured to hold and terminate field wires of a field device.

12. The I/O signal processor of claim 1 wherein each first I/O channel portion of the set of first I/O channel portions comprises a respective fourth electrical connector being configured to removably attach an I/O module, the I/O module including a module I/O channel portion, the first I/O channel portion and the module I/O channel portion electrically connecting the set of first electrical connectors with the second electrical connector when the I/O module is attached to the fourth connector.

13. The I/O signal processor of claim 12 comprising a housing, the signal processing module disposed in the housing, the housing comprising an upper surface, I/O modules attached to the fourth connectors being supported against the upper surface of the housing.

14. The I/O signal processor of claim 1 comprising a housing, the signal processing module disposed in the housing, the housing comprising a mounting being configured to mount the I/O signal processor on a DIN rail.

15. The I/O signal processor of claim 1 wherein the conversion circuits comprise one or more selectable-mode conversion circuits, each selectable-mode conversion circuit comprising an operating mode control circuit electrically connected to the communications circuit and configured to receive a command from the communications circuit setting the operating mode of the selectable-mode conversion circuit.

16. The I/O signal processor of claim 1 wherein the second base is a printed circuit board, the signal processor attached to the printed circuit board.

17. The I/O signal processor of claim 1 wherein the second base comprises an upper printed circuit board electrically connected with a lower printed circuit board, the third electrical connector on the upper printed circuit board, the signal processor disposed on the lower printed circuit board.

18. The I/O signal processor of claim 1 wherein the set of first I/O channel portions permanently electrically connect the sets of first electrical connectors with the second electrical connectors.

19. A system for attaching field devices to a process control network using electrical connections between the field devices and the process control system wherein the system enables selective changing of the configuration of the electrical connections, the system comprising:
  a plurality of interface modules and a signal processing module;
  each interface module of the plurality of interface modules comprising a first base, on the first base a plurality of two or more sets of first electrical connectors, a second electrical connector, and a set of first I/O channel portions, each first I/O channel portion including and electrically connected to a respective set of first electrical connectors and the second electrical connector;
  the signal processing module comprising a second base, on the second base a signal processor, a third electrical connector, and a set of second I/O channel portions associated with the signal processor, the set of second I/O channel portions electrically connecting the signal processor and the third electrical connector, the signal processor comprising a respective conversion circuit in each second I/O channel portion that converts between I/O signals and a digital data format used by the process control network;
  the signal processor further comprising a communications circuit being connected to the respective conversion circuits, the communications circuit being configured and disposed to transmit from the signal processing module digital data received from each respective conversion circuit and to receive into the signal processing module digital data to be converted into I/O signals by the respective conversion circuits;
  the second electrical connector of each interface module of the plurality of interface modules and the third electrical connectors being removably attachable to one another, the second and third electrical connectors when attached to one another electrically connecting each first I/O channel portion of the set of first I/O channel portions of the interface module with a respective second I/O channel portion of the second I/O channel portions and thereby connecting the one or more sets of first electrical connectors terminals with the communication circuit;
  each interface module of the plurality of interface module being selectively attachable and detachable from the signal processing module to enable converting the I/O signal processor between different operating configurations; and
  the set of first I/O channel portions of each interface module of the plurality of interface modules being configured differently than each set of first I/O channel portions of the other interface modules of the plurality of interface modules.

20. The system of claim 19 wherein the number of first I/O channel portions making up the set of first I/O channel portions of each interface module of the plurality of interface modules differs from the number of first I/O channel portions making up each set of first I/O channel portions of the other interface modules of the plurality of interface modules.

21. The system of claim 20 wherein each first electrical connector making up the set of first electrical connectors of each interface module of the plurality of interface modules is of the same type of electrical connector, and the type of electrical connector of each first set of electrical connectors differs among all the interface modules of the plurality of interface modules.

22. The system of claim 20 wherein the number of electrical connectors making up each first set of electrical connectors of each interface module of the plurality of interface modules differ among all of the interface modules of the plurality of interface modules.

23. The system of claim 20 wherein the plurality of interface modules comprises a first interface module and a second interface module, each first I/O channel portion of the first interface module including a fourth electrical connector being configured to removably insert an I/O module in the first I/O channel portion, each first I/O channel portion of the second interface module not including an additional electrical connector.

24. A convertible I/O signal processor for communications between field devices of a process control network and a control system of the process control network, the I/O signal processor comprising:
  an interface module and a signal processing module;
  the interface module comprising a first base, on the first base one or more sets of first electrical connectors, a second electrical connector, and a set of first I/O channel portions, each first I/O channel portion including and electrically connected to a respective set of first electrical connectors and the second electrical connector;
  the signal processing module comprising a second base, a signal processor, a third electrical connector on the base, and a set of second I/O channel portions associated with the signal processor, the set of second I/O channel portions electrically connecting the signal processor and the third electrical connector, the signal processor comprising a respective conversion circuit in each second I/O channel portion that converts between I/O signals and a digital data format used by the process control network;

each first I/O channel portion of the set of first I/O channel portions comprising a respective fourth electrical connector being configured to removably attach an I/O module, the I/O module including a module I/O channel portion, the first I/O channel portion and the module I/O channel portion electrically connecting the set of first electrical connectors with the second electrical connector when the I/O module is attached to the fourth connector;

the second and third electrical connectors being removably attachable to one another, the second and third electrical connectors when attached to one another electrically connecting each first I/O channel portion of the set of first I/O channel portions with a respective second I/O channel portion of the second I/O channel portions; and the interface module being selectively attachable and detachable from the signal processing module to enable converting the I/O signal processor between different operating configurations.

25. The I/O signal processor of claim 24 comprising a housing, the signal processing module being disposed in the housing, the housing comprising an upper surface, I/O modules attached to the fourth connectors being supported against the upper surface of the housing.

26. A convertible I/O signal processor for communications between field devices of a process control network and a control system of the process control network, the I/O signal processor comprising:

an interface module and a signal processing module;

the interface module comprising a first base, on the first base one or more sets of first electrical connectors, a second electrical connector, and a set of first I/O channel portions, each first I/O channel portion including and electrically connected to a respective set of first electrical connectors and the second electrical connector;

the signal processing module comprising a second base, on the second base a signal processor, a third electrical connector on the base, and a set of second I/O channel portions associated with the signal processor, the set of second I/O channel portions electrically connecting the signal processor and the third electrical connector, the signal processor comprising a respective conversion circuit in each second I/O channel portion that converts between I/O signals and a digital data format used by the process control network;

the second base comprising an upper printed circuit board electrically connected with a lower printed circuit board, the third electrical connector on the upper printed circuit board, the signal processor disposed on the lower printed circuit board;

the second and third electrical connectors being removably attachable to one another, the second and third electrical connectors when attached to one another electrically connecting each first I/O channel portion of the set of first I/O channel portions with a respective second I/O channel portion of the second I/O channel portions; and the interface module being selectively attachable and detachable from the signal processing module to enable converting the I/O signal processor between different operating configurations.

27. A system for attaching field devices to a process control network using electrical connections between the field devices and the process control system wherein the system enables selective changing of the configuration of the electrical connections, the system comprising:

a plurality of interface modules and a signal processing module;

each interface module of the plurality of interface modules comprising a first base, on the first base one or more sets of first electrical connectors, a second electrical connector, and a set of first I/O channel portions, each first I/O channel portion including and electrically connected to a respective set of first electrical connectors and the second electrical connector;

the signal processing module comprising a second base, on the second base a signal processor, a third electrical connector, and a set of second I/O channel portions associated with the signal processor, the set of second I/O channel portions electrically connecting the signal processor and the third electrical connector, the signal processor comprising a respective conversion circuit in each second I/O channel portion that converts between I/O signals and a digital data format used by the process control network;

the second electrical connector of each interface module of the plurality of interface modules and the third electrical connectors being removably attachable to one another, the second and third electrical connectors when attached to one another electrically connecting each first I/O channel portion of the set of first I/O channel portions of the interface module with a respective second I/O channel portion of the second I/O channel portions;

each interface module of the plurality of interface module being selectively attachable and detachable from the signal processing module to enable converting the I/O signal processor between different operating configurations;

the set of first I/O channel portions of each interface module of the plurality of interface modules being configured differently than each set of first I/O channel portions of the other interface modules of the plurality of interface modules;

the number of first I/O channel portions making up the set of first I/O channel portions of each interface module of the plurality of interface modules differing from the number of first I/O channel portions making up each set of first I/O channel portions of the other interface modules of the plurality of interface modules; and the plurality of interface modules comprising a first interface module and a second interface module, each first I/O channel portion of the first interface module including a fourth electrical connector being configured to removably insert an I/O module in the first I/O channel portion, each first I/O channel portion of the second interface module not including an additional electrical connector.

* * * * *